United States Patent
Jordan et al.

(10) Patent No.: US 9,645,633 B2
(45) Date of Patent: May 9, 2017

(54) SINGLE RECEIVER SUPERDOZE MODE (71) Applicant: Synaptics Incorporated, San Jose, CA (US)

(72) Inventors: Joel Jordan, Sunnyvale, CA (US); John Weinerth, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 104 days.

(21) Appl. No.: 14/675,627

(22) Filed: Mar. 31, 2015

(65) Prior Publication Data
US 2016/0291679 A1 Oct. 6, 2016

(51) Int. Cl.
G06F 1/32 (2006.01)
G06F 3/041 (2006.01)
G06F 3/044 (2006.01)

(52) U.S. Cl.
CPC .......... G06F 1/3262 (2013.01); G06F 1/3231 (2013.01); G06F 1/3287 (2013.01); G06F 3/044 (2013.01); G06F 3/0416 (2013.01); G06F 2203/04108 (2013.01)

(58) Field of Classification Search
CPC ........................................... G06F 3/041–3/047
See application file for complete search history.

(56) References Cited

U.S. PATENT DOCUMENTS

| | | | |
|---|---|---|---|
| 8,669,960 B2 | 3/2014 | Murphy et al. | |
| 8,797,049 B2 | 8/2014 | Pedersen et al. | |
| 2010/0053097 A1 | 3/2010 | Goh et al. | |
| 2011/0025629 A1 | 2/2011 | Grivna et al. | |
| 2011/0267212 A1 | 11/2011 | Denison | |
| 2012/0050216 A1* | 3/2012 | Kremin | G06F 3/044 345/174 |
| 2012/0113047 A1 | 5/2012 | Hanauer et al. | |
| 2013/0155007 A1 | 6/2013 | Huang et al. | |
| 2013/0176272 A1* | 7/2013 | Cattivelli | G06F 3/041 345/174 |
| 2014/0002406 A1 | 1/2014 | Cormier, Jr. et al. | |
| 2014/0092031 A1* | 4/2014 | Schwartz | G06F 1/3206 345/173 |

* cited by examiner

Primary Examiner — Seokyun Moon
Assistant Examiner — Peijie Shen
(74) Attorney, Agent, or Firm — Osha Liang LLP (57) ABSTRACT

An input device, including: a plurality of sensor electrodes configured to receive a first plurality of capacitive signals and a second plurality of capacitive signals; and a processing system operatively connected to the plurality of sensor electrodes and configured to: operate in a superdoze mode by receiving the first plurality of capacitive signals from a single receive channel connected to the plurality of sensor electrodes; execute an analysis of the first plurality of capacitive signals; and operate, based on the analysis, in an active mode by: driving a plurality of transmitter electrodes with a first drive pattern of a sensing signal; and receiving the second plurality of capacitive signals associated with the first drive pattern from a plurality of receive channels connected to the plurality of sensor electrodes. The superdoze mode requires less power than the active mode.

20 Claims, 4 Drawing Sheets

SINGLE RECEIVER SUPERDOZE MODE

FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments of the invention relate to an input device. The input device comprises: a plurality of sensor electrodes configured to receive a first plurality of capacitive signals and a second plurality of capacitive signals; and a processing system operatively connected to the plurality of sensor electrodes and configured to: operate in a superdoze mode by receiving the first plurality of capacitive signals from a single receive channel connected to the plurality of sensor electrodes; execute an analysis of the first plurality of capacitive signals; and operate, based on the analysis, in an active mode by: driving a plurality of transmitter electrodes with a first drive pattern of a sensing signal; and receiving the second plurality of capacitive signals associated with the first drive pattern from a plurality of receive channels connected to the plurality of sensor electrodes, wherein the superdoze mode requires less power than the active mode.

In general, in one aspect, embodiments of the invention relate to a method for operating an input device comprising a plurality of sensor electrodes. The method comprises: operating in a superdoze mode by receiving a first plurality of capacitive signals over a single receive channel connected to the plurality of sensor electrodes; executing an analysis of the first plurality of capacitive signals; and operating, based on the analysis, in an active mode by: driving a plurality of transmitter electrodes with a first drive pattern of a sensing signal; and receiving a second plurality of capacitive signals associated with the first drive pattern from a plurality of receive channels connected to the plurality of sensor electrodes, wherein the superdoze mode requires less power than the active mode.

In general, in one aspect, embodiments of the invention relate to a processing system connected to a plurality of sensor electrodes. The processing system comprises: a sensor module configured to: operate in a superdoze mode by receiving a first plurality of capacitive signals from a single receive channel connected to the plurality of sensor electrodes; and operate, based on an analysis, in an active mode by: driving a plurality of transmitter electrodes with a first drive pattern of a sensing signal; and receiving a second plurality of capacitive signals associated with the first drive pattern from a plurality of receive channels connected to the plurality of sensor electrodes; and a determination module configured to execute the analysis based on the first plurality of capacitive signals, wherein the analysis determined an input object is present within a sensing region of the plurality of electrodes, and wherein the superdoze mode requires less power than the active mode.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability.

Figure 1:
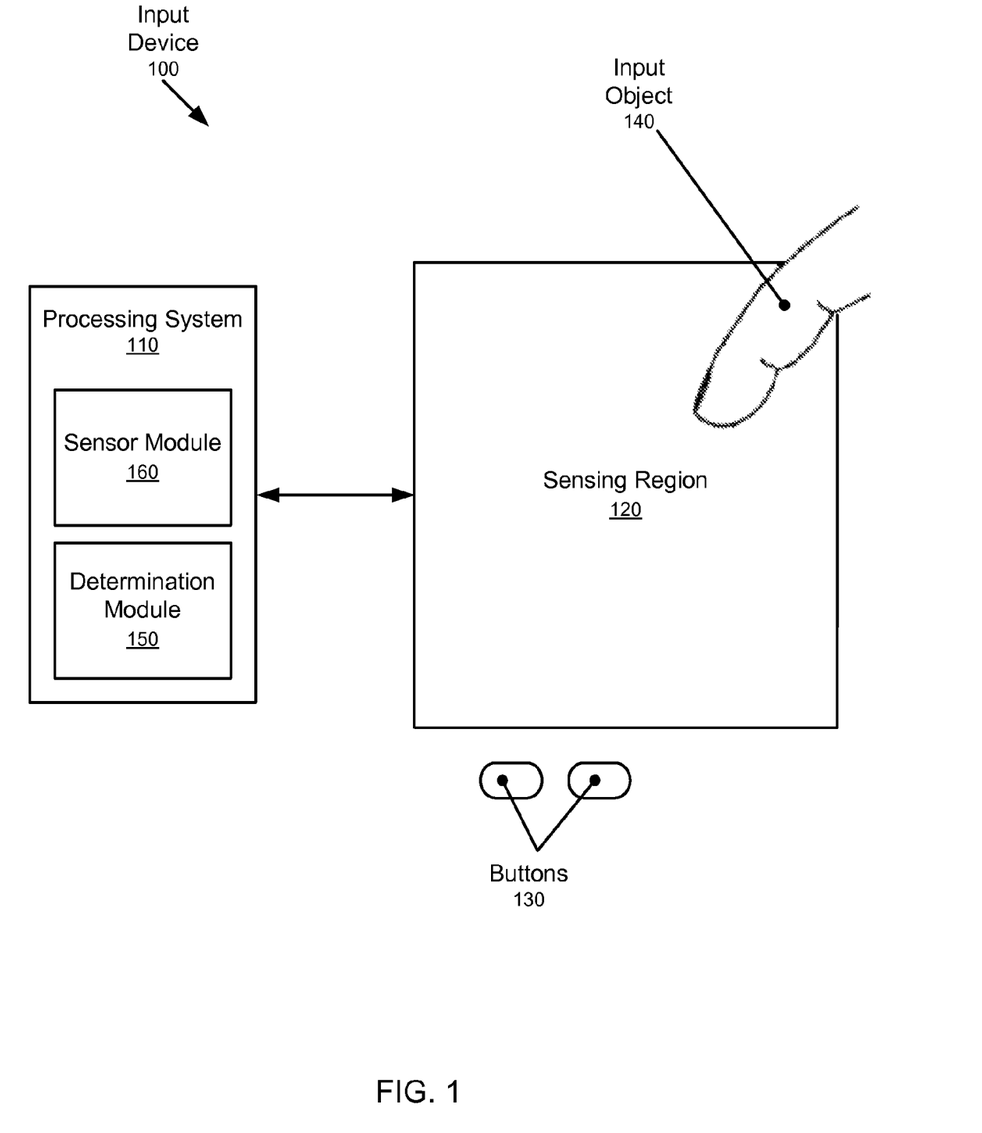
FIG. 1 shows a schematic diagram in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be implemented as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

In one or more embodiments of the invention, the input device (100) and its components (110, 150, 160) operate in three modes: active mode, normal doze mode, and superdoze mode. During active mode, the input object (140) is present within the sensing region (120) and interacts with the input device (100). Accordingly, during active mode, the input device (100) operates to have a quick response time and to collect detailed spatial information in order to determine the exact location of the input object (140) within the sensing region (120). During normal doze mode and superdoze mode according to some embodiments, the input object (140) is not present within the sensing region (120). Accordingly, during normal doze mode or superdoze mode, there is less need for the collection of detailed spatial information. In fact, during normal doze mode or superdoze mode, the input device (100) is primarily awaiting the arrival of the input object (100) somewhere within the sensing region (120). Those skilled in the art, having the benefit of this detailed description, will appreciate that active mode requires more power than normal doze mode and more power than superdoze mode. Further, normal doze mode requires more power than superdoze mode (i.e., superdoze mode requires the least amount of power) (discussed below).

Figure 2A:
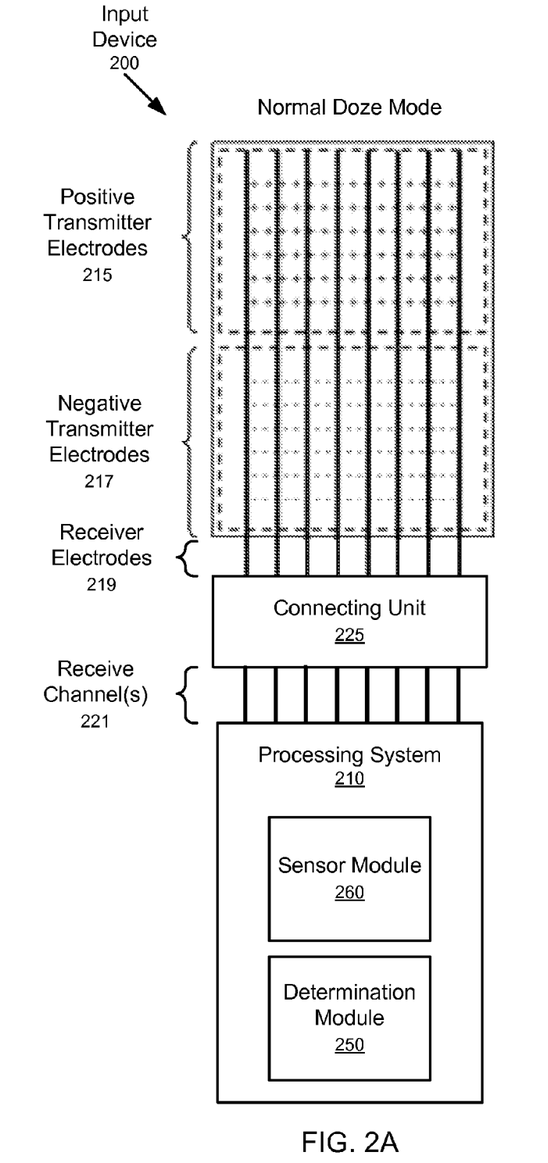
FIGS. 2A and 2B show schematic diagrams in accordance with one or more embodiments.

FIG. 2A shows a schematic diagram of an input device (200) operating in normal doze mode in accordance with one or more embodiments. The input device (200) may be essentially the same as the input device (100), discussed above in reference to FIG. 1. As shown in FIG. 2A, the input device (200) has multiple components including multiple transmitter electrodes (215, 217), multiple receiver electrodes (219), multiple receiver channels (221), and a processing system (210) having a sensor module (260) and a determination module (250). The processing system (210), the sensor module (260), and the determination module (250) may be essentially the same as the processing module (110), the sensor module (160), and the determination module (150), respectively, discussed above in reference to FIG. 1.

In one or more embodiments, the transmitter electrodes in FIG. 2A are partitioned into positive transmitter electrodes (215) and negative transmitter electrodes (217). The positive transmitter electrodes (215) and the negative transmitter electrodes (217) may be equal in number. The positive transmitter electrodes (215) are driven with a positive-polarity waveform, while the negative transmitter electrodes (217) are driven with a negative-polarity waveform. By using this drive pattern, it is possible to determine whether an input object is present within the sensing region (e.g., sensing region (120)) in a single measurement. However, this drive pattern does not provide sufficient spatial information to determine the exact location of the input object within the sensing region. Other drive patterns are also possible.

As shown in FIG. 2A, the input device (200) includes a connecting unit (225). The connecting unit (225) electrically connects (e.g., via circuitry and/or software) the multiple receiver electrodes (219) to one or more receiver channels (221). Although the connecting unit (225) is shown as being external to the processing system (210), in one or more embodiments the connecting unit (225) is internal to the processing system (210).

As also shown in FIG. 2A, in normal doze mode, the connecting unit (225) connects each of the receiver electrodes (219) to its own receive channel. In other words, in normal doze mode, there is one receive channel for each receiver electrode. It is via the receive channels (221) that the processing system (210) (e.g., sensor module (260)) is able to receive capacitive sensing signals from the receiver electrodes (219). It is from these received capacitive sensing signals that the processing system (210) (e.g., determination module (250)) is able to determine the presence of the input object. Once it is determined from the received capacitive sensing signals that an input object is present, self-capacitance profiles and/or a full mutual capacitive image may be acquired to determine the exact location of the input object within the sensing region.

Those skilled in the art, having the benefit of this detailed description, will appreciate that there is an energy cost to run (i.e., power-up) each receive channel (221). In other words, as the number of receive channels (221) increases, the amount of power/energy required also increases. Those skilled in the art, having the benefit of this detailed description, will also appreciate that as there is one receive channel (221) for each receive electrode (219), there is a measurement for each receiver electrode (219). This fine granularity of measurement may be unnecessary to simply detect, without concern for exact location, the presence of an input object within the sensing region.

In one or more embodiments, the configuration of the input device (200) in active mode is similar to its configuration in normal doze mode. For example, in both active mode and normal doze mode, there is one receive channel (221) for each receiver electrode (219). However, the drive pattern in active mode is different from the drive pattern in normal doze mode. Specifically, the drive pattern in active mode allows for the collection of detailed spatial information and the determination of the exact location of the input object in the sensing region. Moreover, the drive pattern in active mode requires more power than the drive pattern of the normal doze mode. In other words, there is a power savings by operating in the normal doze mode instead of the active mode.

In one or more embodiments of the invention, the input device (200) will be subjected to correlated interference. In correlated interference, the same interference source is coupled into all receive channels. In one or more embodiments of the invention, the determination module (250) is configured to execute a correlated interference assessment to determine whether correlated interference is present. The correlated interference assessment may include obtaining noise values from the multiple received capacitive sensing signals from the receiver electrodes (219), calculating an estimate of noise correlation based on the noise values, and comparing the estimate of noise correlation with at least one threshold.

Figure 2B:
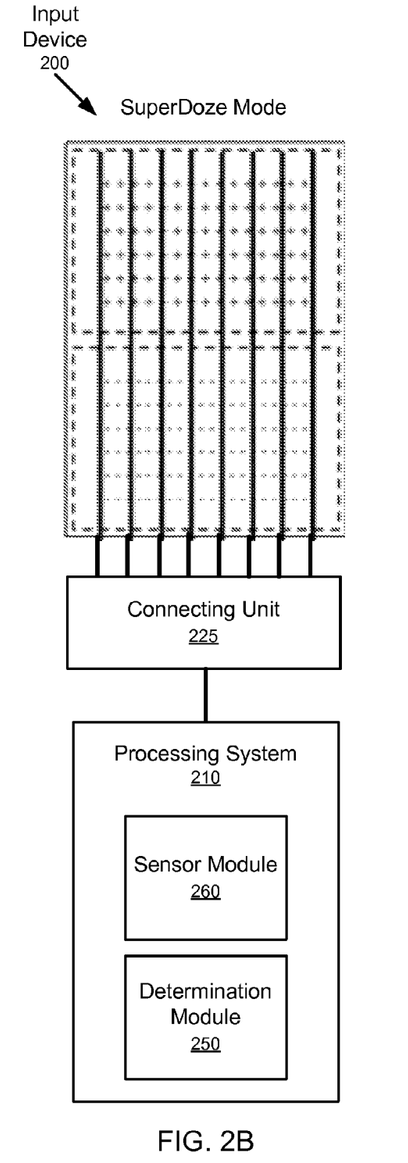

FIG. 2B shows a schematic diagram of the input device (200) operating in superdoze mode in accordance with one or more embodiments. Like in normal doze mode, the drive pattern may include applying a positive-waveform to half of the transmitter electrodes (215) and a negative-waveform to the other half (217) of the transmitter electrodes. Other drive patterns are also possible. In some embodiments, superdoze mode provides reduced positional information on an input object that is detected in comparison to normal doze mode. Similarly, normal doze mode typically provides reduced positional or spatial information in comparison to active mode.

However, unique to the superdoze mode, the connecting unit (225) electrically connects (e.g., via circuitry and/or software) multiple receiver electrodes (219) to a single receive channel (i.e., the other receive channels are powered down). In other words, in superdoze mode, the connecting unit (225) effectively sums (e.g., via circuitry) the measurements for each receiver electrode (219). In some embodiments, the superdoze mode may use multiple receive channels, but still use a smaller number of channels than normal doze mode in order to conserve power. It is from this sum of received capacitive sensing signals that the processing system (210) (e.g., determination module (250)) is able to determine the presence of the input object. Once it is determined from the received capacitive sensing signals that an input object is present, self-capacitance profiles and/or a full mutual capacitive image may be acquired to determine the exact location of the input object within the sensing region.

Those skilled in the art, having the benefit of this detailed description, will appreciate that the single receive channel (221) in the superdoze mode requires less power/energy than the multiple receive channels (221) of the normal doze mode. In other words, there is a power savings by operating in the superdoze mode instead of the normal doze mode.

As discussed above, the input device (200) may be subjected to correlated interference. In correlated interference, as the same interference source is coupled to all into all receive channels, the sum of the noise will be very large. For N receive electrodes, noise coupled equally into all receive electrodes would be multiplied by N in the sum received by the processing system (210). If an input object (e.g., a finger) within the sensing region only covers M receiver electrodes (i.e., M<N), its sum will be approximately M times as large as the signal that would have been received on a single receiver. In other words, interference is increased more than the signal, which in turn decreases the signal-to-noise (SNR) ratio. If correlated interference occurs while the input device (200) is in superdoze mode, an analysis of the received capacitive sensing signals may incorrectly determine that an input object is present within the sensing region (i.e., the interference may be mistaken for an input object).

Figure 3:
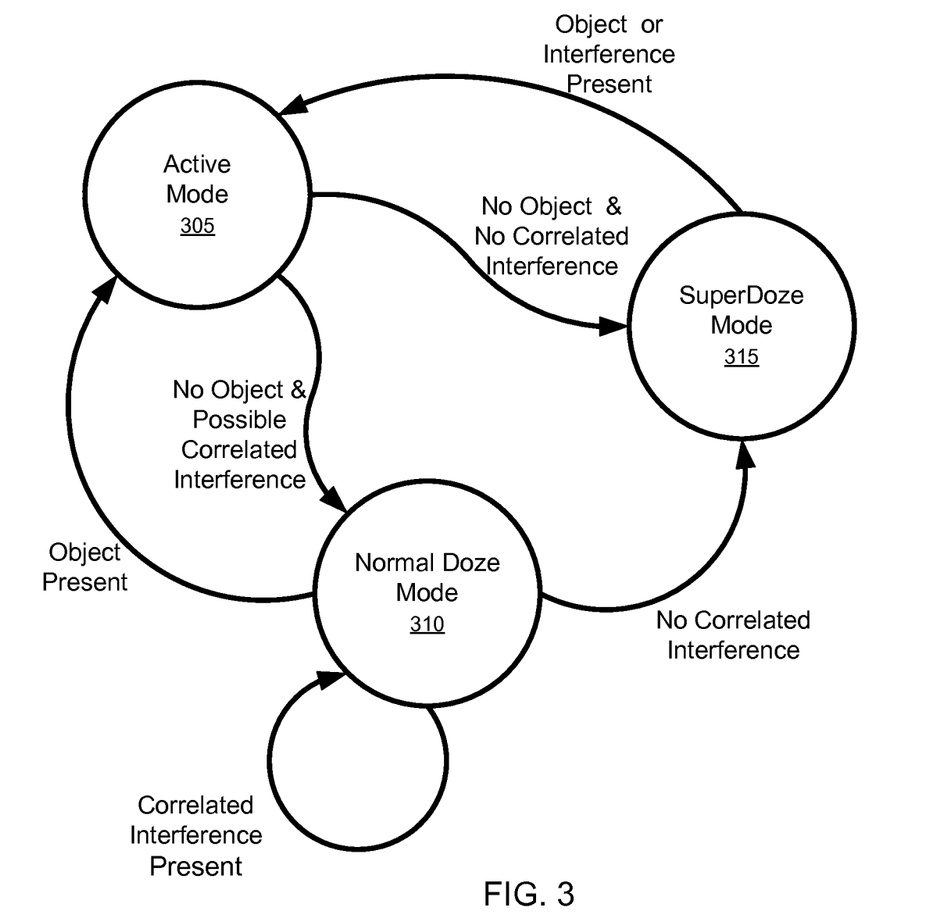
FIG. 3 shows a state diagram in accordance with one or more embodiments.

FIG. 3 shows a state diagram for the input device (100, 200) in accordance with one or more embodiments. As shown in FIG. 3, and as discussed above, the input device operates in three different modes: active mode (305), normal doze mode (310), and superdoze mode (315).

In one or more embodiments, when the input device is operating in superdoze mode (315), the input device transitions to the active mode (305) in response to detecting an input object within the sensing region and/or detecting correlated interference. In fact, as discussed above, the correlated interference detected during superdoze mode may be mistaken for an input object.

In one or more embodiments, when the input device is operating in active mode (305), the input device transitions to either normal doze mode (310) or superdoze mode (315) in response to the lack of an input object. Specifically, if it is known in advance that the input device is unlikely to experience correlated interference (e.g., the input device is well-shielded, there is no display device in the system including the input device, etc.), the input device may transition from the active mode (305) directly to the superdoze mode (315). However, if the input device is likely to experience correlated interference, the input device may transition from the active mode (305) to the normal doze mode (310).

In one or more embodiments, when the input device is operating in normal doze mode (310), the input device may transition to the active mode (305) in response to detecting an input object within the sensing region. In one or more embodiments, when the input device is operating in normal doze mode (310), the input device executes a correlated interference assessment. When it is determined that little or no correlated interference is present, the input device may transition to superdoze mode (315). However, when the input device determines that correlated interference is present, the input device remains in normal doze mode (310) (i.e., it does not transition to superdoze mode (315)).

In one or more embodiments of the invention, the input device (100, 200) is connected to a host system. In such embodiments, the host system may be in a low-power mode as the input device transitions between states. In other words, the input device (100, 200) is able to determine when the necessary conditions are present to transition between states without receiving instructions to transition from the host system.

Figure 4:
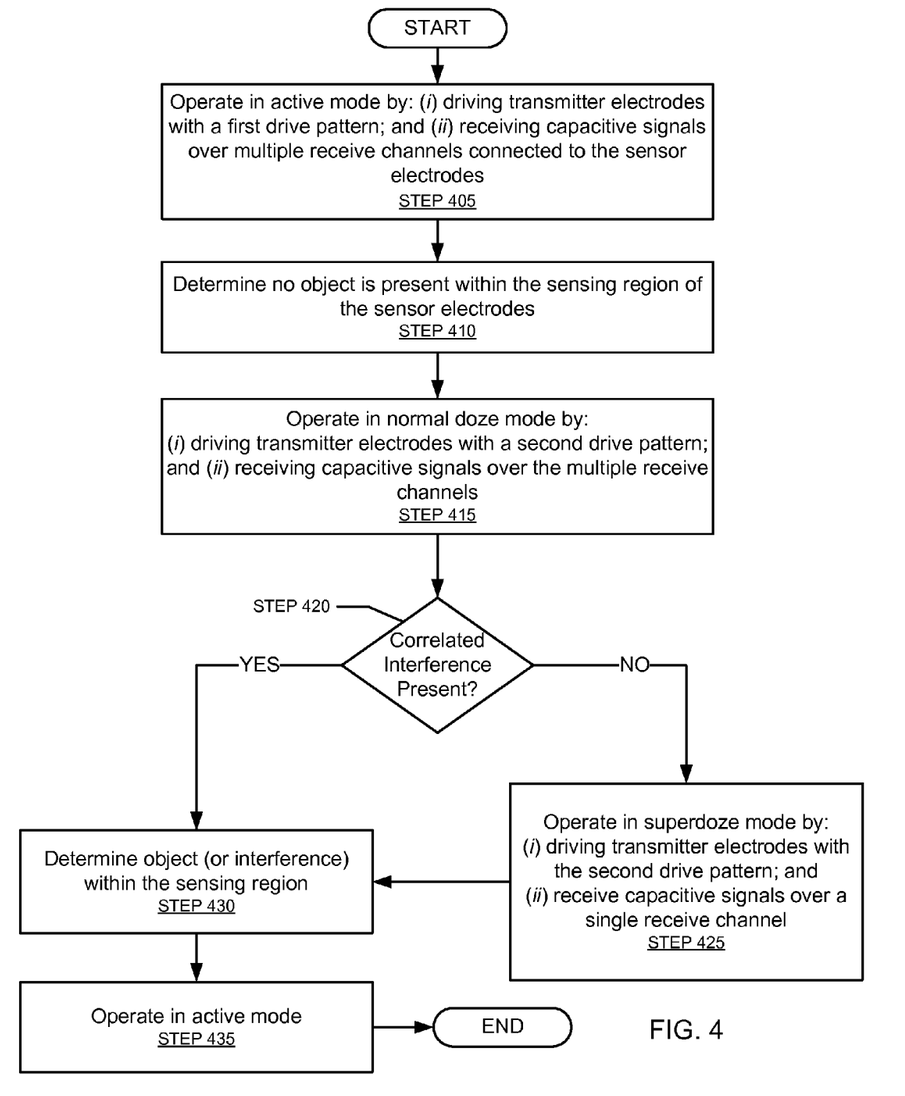
FIG. 4 shows a flowchart in accordance with one or more embodiments.

FIG. 4 shows a flowchart in accordance with one or more embodiments. The process shown in FIG. 4 may involve, for example, one or more components discussed above in reference to FIG. 1 and/or FIGS. 2A and 2B (e.g., processing system (110), processing system (210)). One or more steps shown in FIG. 4 may be omitted, repeated, and/or performed in a different order among different embodiments of the invention. Accordingly, embodiments of the invention should not be considered limited to the specific number and arrangement of steps shown in FIG. 4.

Initially, the input device operates in active mode (Step 405). During active mode, the input object is present within the sensing region of the input device. Accordingly, the input device operates to collect detailed spatial information regarding the location of the input object within the sending region. This operation may include applying, to the transmitter electrodes, a drive pattern that allows for the collection of detailed spatial information. This operation may also include connecting each receiver electrode to a receive channel (i.e., all receive channels are powered up). In such a configuration, the processing system receives the capacitive sensing signals from the receiver electrodes over the multiple receive channels and can acquire measurements on an electrode-by-electrode basis.

In Step 410, it is determined (e.g., from the received capacitive sensing signals) that the input object is no longer within the sensing region. Specifically, the user has withdrawn his or her input object (e.g., stylus, finger, etc.) from the sensing region.

In Step 415, the input device operates in normal doze mode. Specifically, the input device operates in normal doze mode in response to the lack of the input object in the sensing region. During normal doze mode, it is less necessary for the input device to collect detailed spatial information. Accordingly, a different drive pattern is applied to the transmitter electrodes. For example, a positive-polarity waveform may be applied to half of the transmitter electrodes and a negative-polarity waveform may be applied to the other half of the transmitter electrode. This drive pattern still allows for detecting the arrival of an input object somewhere in the sensing region. However, this drive pattern requires less power than the drive pattern used during the active mode. Also during normal doze mode, each receiver received electrode is attached to a different receive channel. Accordingly, like active mode, the processing system receives the capacitive sensing signals from the receiver electrodes over the multiple receive channels and can acquire measurements on an electrode-by-electrode basis.

In Step 420, it is determined whether correlated interference is present. This determination may be made by obtaining noise values from the multiple received capacitive sensing signals from the receiver electrodes, calculating an estimate of noise correlation based on the noise values, and comparing the estimate of noise correlation with at least one threshold. When it is determined that correlated interference is present, the process proceeds to Step 430. When it is determined that correlated interference is not present, the process proceeds to Step 425.

In Step 425, the input device operates in superdoze mode. Specifically, the input device operates in superdoze mode in response to the lack of the input object in the sensing region and the lack of correlated interference. Like normal doze mode, it is less necessary during superdoze mode for the input device to collect detailed spatial information. In fact, superdoze mode and normal doze mode may use the same drive pattern for the transmitter electrodes. However, in superdoze mode, all of the receiver electrodes are connected to a single receive channel (i.e., the other receive channels are powered down). This results in a considerable powers savings over both active mode and normal doze mode. In such a configuration, the processing system receives the capacitive sensing signals from the receiver electrodes over the single receive channels. Accordingly, it is not possible to acquire measurements on an electrode-by-electrode basis. However, such a fine granularity is not required. All that is required is the ability to determine that an input object has arrived within the sensing region.

In Step 430, it is determined that an input object has arrived within the sensing region. Specifically, the arrival of the input object is determined by executing an analysis of the capacitive sensing signals from the receiver electrodes. As discussed above, if the input device is operating in superdoze mode, the occurrence of correlated interference may be mistaken for the arrival of an input object.

In Step 435, the input device returns to operation in active mode in response to the arrival of the input object.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device, comprising:
   a plurality of sensor electrodes configured to receive a first plurality of capacitive signals and a second plurality of capacitive signals;
   a connecting unit comprising circuitry configured to:
      generate a sum based on the first plurality of capacitive signals; and
      connect the plurality of sensor electrodes with a plurality of receive channels; and
   a processing system operatively connected to the plurality of sensor electrodes and configured to:
      operate in a superdoze mode by receiving the sum associated with the first plurality of capacitive signals from a single receive channel of the plurality of receive channels, wherein the other receive channels are powered down during the superdoze mode;
      execute an analysis of the sum associated with the first plurality of capacitive signals; and
      operate, based on the analysis, in an active mode by:
         driving a plurality of transmitter electrodes with a first drive pattern of a sensing signal; and
         receiving the second plurality of capacitive signals associated with the first drive pattern from the plurality of receive channels connected to the plurality of sensor electrodes by the connecting unit,
      wherein the superdoze mode requires less power than the active mode.

2. The input device of claim 1, wherein executing the analysis comprises determining an input object is present within a sensing region of the plurality of sensor electrodes.

3. The input device of claim 1, wherein the processing system is further configured to:
   determine a lack of an input object in a sensing region of the plurality of sensor electrodes; and
   enter, based on the lack of the input object, the superdoze mode.

4. The input device of claim 1, wherein the processing system is further configured to:
   execute a correlated interference assessment based on a third plurality of signals from the plurality of receive channels connected to the plurality of sensor electrodes.

5. The input device of claim 4, wherein the processing system is further configured to:
   determine a lack of an input object in a sensing region of the plurality of sensor electrodes; and
   operate, based on the lack of the input object, in a normal doze mode by:
      driving the plurality of transmitter electrodes with a second drive pattern, the second drive pattern resulting in reduced spatial information in comparison to the first drive pattern; and
      receiving the third plurality of capacitive signals from the plurality of receive channels connected to the plurality of sensor electrodes;
   enter, in response to the correlated interference assessment not detecting correlated interference, the superdoze mode,
   wherein the normal doze mode requires less power than the active mode, and
   wherein the superdoze mode requires less power than the normal doze mode.

6. The input device of claim 4, wherein the processing system is further configured to:
   determine a lack of an input object in a sensing region of the plurality of sensor electrodes; and
   operate, based on the lack of the input object, in a normal doze mode by:
      driving a plurality of transmitter electrodes with a second drive pattern, the second drive pattern resulting in reduced spatial information in comparison to the first drive pattern; and
      receiving the third plurality of capacitive signals from the plurality of receive channels connected to the plurality of sensor electrodes; and
   remain, in response to the correlated interference assessment detecting correlated interference, in the normal doze mode,
   wherein the normal doze mode requires less power than the active mode, and
   wherein the superdoze mode requires less power than the normal doze mode.

7. The input device of claim 4, wherein executing the correlated interference assessment comprises:
   obtaining a plurality of noise values from the third plurality of capacitive signals;
   calculating an estimate of noise correlation based on the plurality of noise values from the third plurality of capacitive signals; and
   comparing the estimate of noise correlation with at least one threshold.

8. The input device of claim 1, wherein the processing system is connected to a host system, and wherein the host system is in a low-power mode during the analysis of the first plurality of capacitive signals.

9. The input device of claim 5, wherein driving the plurality of transmitter electrodes with the second drive pattern comprises:
   driving a first set of the plurality of transmitter electrodes with a positive-polarity waveform; and
   driving a second set of the plurality of transmitter electrodes with a negative-polarity waveform.

10. A method for operating an input device comprising a plurality of sensor electrodes, comprising:
    receiving, by a plurality of electrodes, a first plurality of capacitive signals
    generating a sum based on the first plurality of capacitive signals;

operating in a superdoze mode by receiving the sum associated with the first plurality of capacitive signals from a single receive channel of a plurality of receive channels connected to the plurality of sensor electrodes, wherein the other receive channels are powered down during the superdoze mode;

executing an analysis of the sum associated with the first plurality of capacitive signals; and operating, based on the analysis, in an active mode by:
driving a plurality of transmitter electrodes with a first drive pattern of a sensing signal; and
receiving a second plurality of capacitive signals associated with the first drive pattern from the plurality of receive channels connected to the plurality of sensor electrodes, wherein the superdoze mode requires less power than the active mode.

11. The method of claim 10, wherein executing the analysis comprises determining an input object is present within a sensing region of the plurality of sensor electrodes.

12. The method of claim 10, further comprising:
determining a lack of an input object in a sensing region of the plurality of sensor electrodes; and
entering, based on the lack of the input object, the superdoze mode.

13. The method of claim 10, further comprising:
executing a correlated interference assessment based on a third plurality of signals from the plurality of receive channels connected to the plurality of sensor electrodes.

14. The method of claim 13, further comprising:
determining a lack of an input object in a sensing region of the plurality of sensor electrodes; and
operating, based on the lack of the input object, in a normal doze mode by:
driving the plurality of transmitter electrodes with a second drive pattern, the second drive pattern resulting in reduced spatial information in comparison to the first drive pattern; and
receiving the third plurality of capacitive signals from the plurality of receive channels connected to the plurality of sensor electrodes;
entering, in response to the correlated interference assessment not detecting correlated interference, the superdoze mode,
wherein the normal doze mode requires less power than the active mode, and
wherein the superdoze mode requires less power than the normal doze mode.

15. The method of claim 13, further comprising:
determining a lack of an input object in a sensing region of the plurality of sensor electrodes; and
operating, based on the lack of the input object, in a normal doze mode by:
driving the plurality of transmitter electrodes with a second drive pattern, the second drive pattern resulting in reduced spatial information in comparison to the first drive pattern; and
receiving the third plurality of capacitive signals from the plurality of receive channels connected to the plurality of sensor electrodes; and
remaining, in response to the correlated interference assessment detecting correlated interference, in the normal doze mode,
wherein the normal doze mode requires less power than the active mode, and
wherein the superdoze mode requires less power than the normal doze mode.

16. The method of claim 13, wherein executing the correlated interference assessment comprises:
obtaining a plurality of noise values from the third plurality of capacitive signals; and
comparing the plurality of noise values with at least one threshold.

17. A processing system connected to a plurality of sensor electrodes, comprising:
a connecting unit comprising circuitry configured to:
generate a sum based on a first plurality of capacitive signals received by the plurality of sensor electrodes; and
connect the plurality of sensor electrodes with a plurality of receive channels;
a sensor module configured to:
operate in a superdoze mode by receiving the sum associated with the first plurality of capacitive signals from a single receive channel of the plurality of receive channels connected to the plurality of sensor electrodes by the connecting unit,
wherein the other receive channels are powered down during the superdoze mode; and
operate, based on an analysis of the sum, in an active mode by:
driving a plurality of transmitter electrodes with a first drive pattern of a sensing signal; and
receiving a second plurality of capacitive signals associated with the first drive pattern from the plurality of receive channels connected to the plurality of sensor electrodes; and
a determination module configured to execute the analysis of the sum associated with the first plurality of capacitive signals,
wherein the analysis determined an input object is present within a sensing region of the plurality of electrodes, and
wherein the superdoze mode requires less power than the active mode.

18. The processing system of claim 17, wherein the determination module is further configured to execute a correlated interference assessment based on a third plurality of signals from the plurality of receive channels connected to the plurality of sensor electrodes.

19. The processing system of claim 18, wherein:
the determination module is further configured to determine lack of an input object in a sensing region of the plurality of sensor electrodes; and
the sensor module is further configured to:
operate, based on the lack of the input object, in a normal doze mode by:
driving the plurality of transmitter electrodes with a second drive pattern, the second drive pattern resulting in reduced spatial information in comparison to the first drive pattern; and
receiving the third plurality of capacitive signals from the plurality of receive channels connected to the plurality of sensor electrodes; and
enter, in response to the correlated interference assessment not detecting correlated interference, the superdoze mode,
wherein the normal doze mode requires less power than the active mode, and
wherein the superdoze mode requires less power than the normal doze mode.

20. The processing system of claim 18, wherein:
the determination module is further configured to determine a lack of an input object in a sensing region of the plurality of sensor electrodes; and
the sensor module is further configured to:
  operate, based on the lack of the input object, in a normal doze mode by:
    driving the plurality of transmitter electrodes with a second drive pattern, the second drive pattern resulting in reduced spatial information in comparison to the first drive pattern; and
    receiving the third plurality of capacitive signals from the plurality of receive channels connected to the plurality of sensor electrodes; and
  remain, in response to the correlated interference assessment detecting correlated interference, in the normal doze mode,
wherein the normal doze mode requires less power than the active mode, and
wherein the superdoze mode requires less power than the normal doze mode.

* * * * *